United States Patent
Yano et al.

(10) Patent No.: US 10,680,448 B2
(45) Date of Patent: Jun. 9, 2020

(54) POWER STORAGE UNIT AND POWER STORAGE SYSTEM

(71) Applicant: Sanyo Electric Co., Ltd., Daito-shi, Osaka (JP)

(72) Inventors: Junya Yano, Hyogo (JP); Tomoyuki Matsubara, Hyogo (JP); Hidetsugu Mukae, Hyogo (JP); Jun Asakura, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 46 days.

(21) Appl. No.: 15/767,208

(22) PCT Filed: Oct. 5, 2016

(86) PCT No.: PCT/JP2016/004482
§ 371 (c)(1),
(2) Date: Apr. 10, 2018

(87) PCT Pub. No.: WO2017/073018
PCT Pub. Date: May 4, 2017

(65) Prior Publication Data
US 2019/0074699 A1 Mar. 7, 2019

(30) Foreign Application Priority Data
Oct. 30, 2015 (JP) .................. 2015-213805

(51) Int. Cl.
*H02J 7/00* (2006.01)
*H01M 10/48* (2006.01)
(Continued)

(52) U.S. Cl.
CPC ......... *H02J 7/0021* (2013.01); *H01M 10/441* (2013.01); *H01M 10/482* (2013.01);
(Continued)

(58) Field of Classification Search
CPC ........ H02J 7/0021; H02J 1/102; H02J 7/0016; H02J 7/0018; H02J 7/0024; H02J 7/0065; H01M 10/441; H01M 10/482
(Continued)

(56) References Cited

U.S. PATENT DOCUMENTS

| | | | |
|---|---|---|---|
| 2009/0267566 A1* | 10/2009 | Yano | H02J 7/0016 320/118 |
| 2010/0019724 A1 | 1/2010 | Mizutani et al. | |
| 2016/0261007 A1 | 9/2016 | Furukawa et al. | |

FOREIGN PATENT DOCUMENTS

| | | |
|---|---|---|
| JP | 2006-50716 A | 2/2006 |
| JP | 2010-29050 A | 2/2010 |
| WO | 2015/087487 A1 | 6/2015 |

OTHER PUBLICATIONS

International Search Report dated Dec. 20, 2016, issued in counterpart International Application No. PCT/JP2016/004482 (1 page).

* cited by examiner

*Primary Examiner* — Zixuan Zhou
(74) *Attorney, Agent, or Firm* — Westerman, Hattori, Daniels & Adrian, LLP (57) ABSTRACT

A voltage detection circuit detects the voltage of a plurality of serially connected cells in a power storage unit. The voltage detection circuit receives a supply of a power supply voltage from both ends of the plurality of cells. A DC-DC converter converts the voltage between both ends of the plurality of cells into another DC voltage. An adjustment circuit adjusts the power consumption of the plurality of cells. The adjustment circuit operates using the DC voltage generated by the DC-DC converter as the power supply voltage.

8 Claims, 3 Drawing Sheets

(51) Int. Cl.
*H01M 10/44* (2006.01)
*H02J 1/10* (2006.01)
(52) U.S. Cl.
CPC ............ *H02J 1/102* (2013.01); *H02J 7/0016* (2013.01); *H02J 7/0018* (2013.01); *H02J 7/0024* (2013.01); *H02J 2207/20* (2020.01)
(58) Field of Classification Search
USPC .......................................... 320/109, 116–119
See application file for complete search history.

POWER STORAGE UNIT AND POWER STORAGE SYSTEM

TECHNICAL FIELD

The present invention relates to a power storage unit for managing a plurality of cells connected in series, and a power storage system having a plurality of power storage unites.

BACKGROUND ART

In recent years, hybrid vehicles (HV), plug-in hybrid vehicles (PHV), and electric vehicles (EV) are being spread. Secondary batteries as a key device are installed in these vehicles. As secondary batteries for the vehicle, the nickel hydride batteries and the lithium ion batteries are spread. In the future, it is expected that spread of the lithium ion batteries having high energy density are accelerated.

Since the operable voltage range and the prohibited voltage range in the lithium ion batteries are close, the stricter voltage management is necessary in the lithium ion batteries than other types of batteries. When an assembled battery in which a plurality of the lithium ion battery cells are connected in series is used, a voltage detection circuit is provided for detecting each of the battery cells. The voltage detected in each of the battery cells is used for controlling of charge or discharge, equalization in the cell voltages, or the like.

In order to achieve a higher voltage or a higher capacity, a plurality of assembled batteries are connected in series or parallel. In this case, cell balance among the whole of the plurality of assembled batteries, is required. A communication occurs, between one voltage detection circuit which manages one assembled battery and another voltage detection circuit which manages another assembled battery. Another communication occurs, between the voltage detection circuit and a control circuit. These communication loads are generally different, depending on the voltage detection circuits. Power consumptions in the voltage detection circuits are not equal.

In a case where a power supply of the voltage detection circuit is received from the assembled battery which is managed by such a voltage detection circuit, when power consumptions in the voltage detection circuits are not equal, the voltages or remaining capacities in the assembled batteries become not equal. Therefore, the following method is considered (for example, refer to Patent Literature 1). A discharge circuit for adjusting power consumption is connected to each of the assembled batteries, and thereby the voltages and remaining capacities of the assembled batteries are equalized.

CITATION LIST

Patent Literature

Patent Literature 1: Japanese Laid-Open Patent Publication No. 2006-50716

SUMMARY OF THE INVENTION

Generally, such a discharge circuit is configured of a resistor and a switch, and is connected to both ends of the assembled battery, to adjust power consumption of the assembled battery. However, when both-end voltage of the assembled battery is high, power consumed in the resistor becomes high. Thus, heat generation in the resistor becomes large. Therefore, it is necessary that the discharge circuit is designed considering high voltage resistant protection, heat resistant protection. Thus, in the power storage unit which incorporates the assembled battery, the circuit scale and cost increase.

The present disclosure is developed for the purpose of solving such requirements. One non-limiting and explanatory embodiment provides a technology for equalizing the voltage or the remaining capacity in power storage units while minimizing any increase in the circuit scale and cost.

To solve the above-mentioned requirements, a power storage unit of one explanatory embodiment of the present invention includes: a voltage detection circuit that detects voltages of a plurality of series connected cells in a power storage unit, and receives a supply of a power supply voltage from both ends of the plurality of cells; a DC-DC converter that converts a voltage between both ends of the plurality of cells into another DC voltage; an adjustment circuit that adjusts power consumption of the plurality of cells, and operates using the another DC voltage generated by the DC-DC converter as a power supply voltage.

Any desired combinations of the above-described components and converted expressions of the present invention in methods, devices, systems, and other similar entities are still effective as aspects of the present invention.

According to the present invention, the voltage or the remaining capacity in power storage units can be equalized, while minimizing any increase in the circuit scale and cost.

DESCRIPTION OF EMBODIMENT

Figure 1:
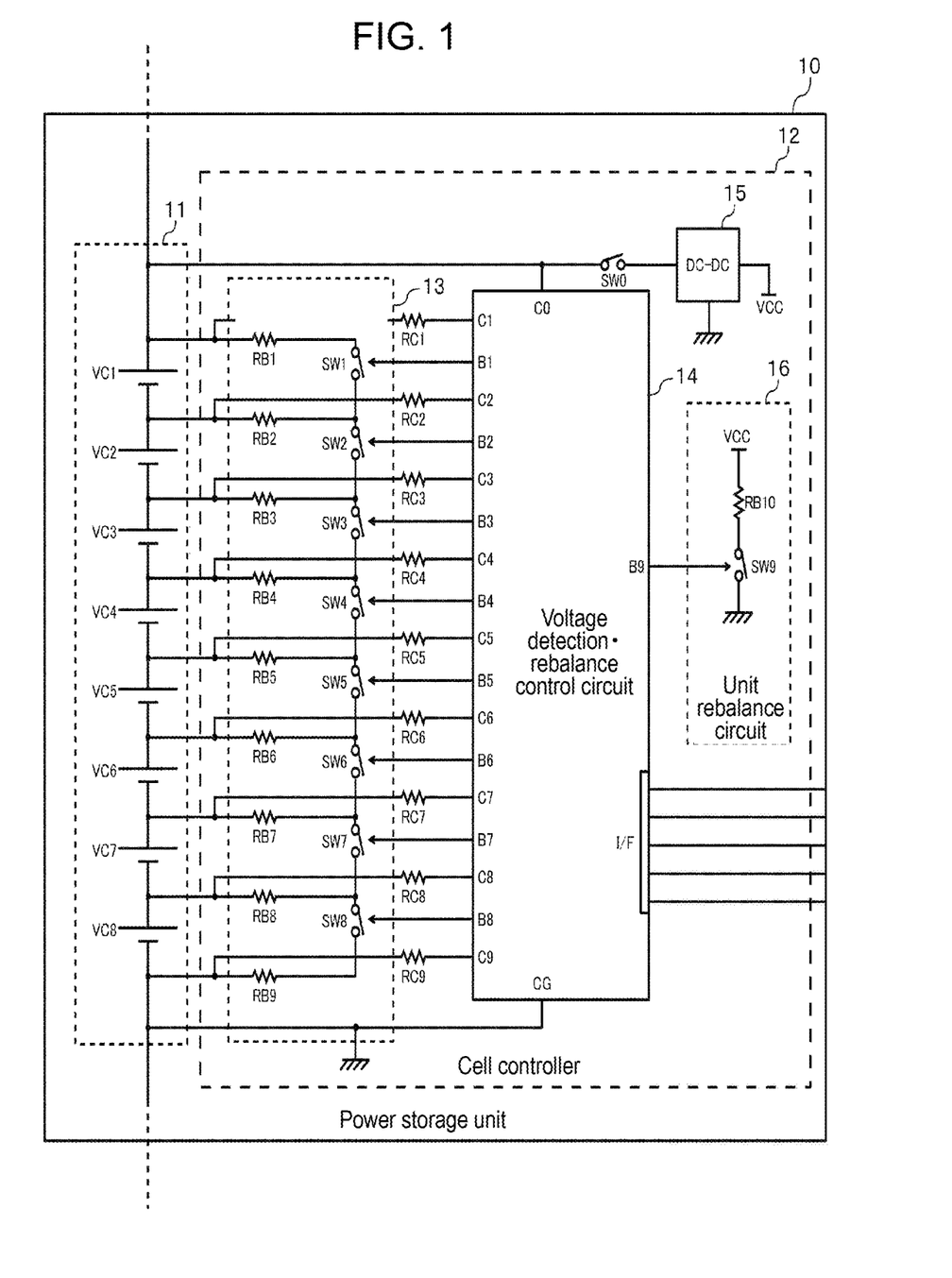
FIG. 1 is a view of a configuration of a power storage unit according to an exemplary embodiment of the present invention.
Figure 2:
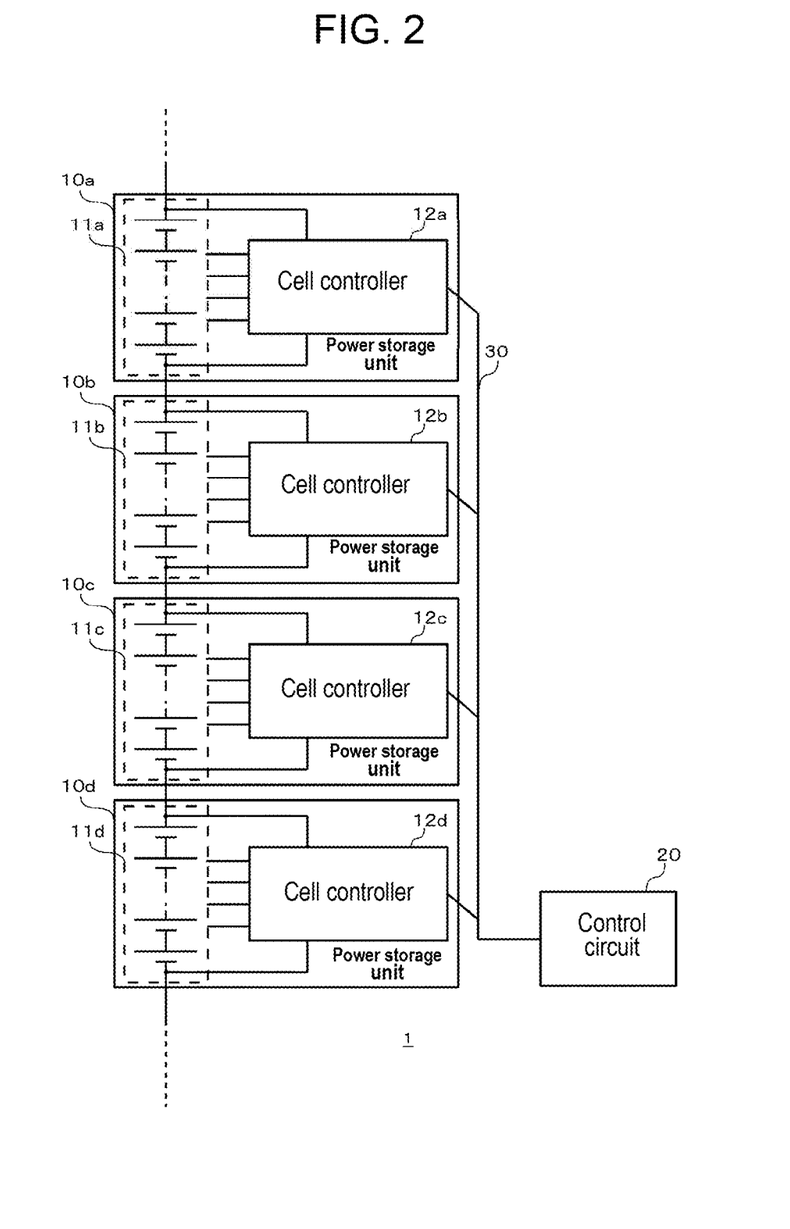
FIG. 2 is a view of a configuration of a power storage system where a plurality of power storage units of FIG. 1 are connected in series.

FIG. 1 is a view of a configuration of power storage unit 10 according to an exemplary embodiment of the present invention. FIG. 2 is a view of a configuration of power storage system 1 where a plurality of power storage units 10 of FIG. 1 are connected in series. As shown in FIG. 1, power storage unit 10 is provided with assembled battery 11 and cell controller 12. Assembled battery 11 is configured of a plurality of single cells VC1 to VC8 connected in series. The single cell is configured of one piece of a single battery, or a plurality of single batteries connected in series. An example of the single cell includes any one of lithium ion battery cell, nickel hydride battery cell, and electric double-layer capacitor cell. Herein, the single cell is assumed to be the lithium ion battery cell, for example. The nominal voltage of the lithium ion battery cell is 3.6 to 3.7 V. As eight pieces of single cells VC1 to VC8 are connected in series in the example of FIG. 1, the both-end voltage of assembled battery 11 is 28.8 to 29.6 V. The number of the single cells connected in series is not limited to eight.

Cell controller 12 includes cell rebalance circuit 13, voltage detection• rebalance control circuit 14, DC-DC converter 15, and unit rebalance circuit 16. An upper side node of single cell VC1, nodes between VC1 to VC8, and a lower side node of single VC8, are respectively connected to terminals C1 to C9 of voltage detection• rebalance control circuit 14, through voltage detection lines. Resistors RC1 to RC8 are respectively connected to the voltage detection lines. Voltage detection• rebalance control circuit 14 can detect a voltage of each of single cells VC1 to VC8, based on electric potentials of terminals C1 to C9. Nodes of both ends of assembled battery 11 are respectively connected to power supply terminal CO, ground terminal CG of voltage detection• rebalance control circuit 14 Voltage detection• rebalance control circuit 14 receives a supply of a power supply voltage from both ends of assembled battery 11, and also voltage detection• rebalance control circuit 14 can detect both-end voltage of assembled battery 11 (hereinafter referred as the assembled battery voltage).

Cell rebalance circuit 13 includes discharge resistors RB1 to RB9 and discharge switches SW1 to SW8, and cell rebalance circuit 13 is a circuit which carries out rebalance control among single cells VC1 to VC8 by using power consumption (electric power loss) of discharge resistors RB1 to RB9. One end of each of discharge resistors RB1 to RB9 is respectively connected to the upper side node of single cell VC1, the nodes between VC1 to VC8, and another end of each of discharge resistors RB1 to RB9 is respectively connected to discharge resistors SW1 to SW8. Discharge resistors SW1 to SW8 are connected in series. Control terminals of discharge resistors SW1 to SW8 are respectively connected to terminals B1 to B8 of voltage detection• rebalance control circuit 14.

Semiconductor switches (MOSFETs or IGBTs), or relays, can be used as discharge resistors RB1 to RB9. In a case where semiconductor switches are used, gate terminals of semiconductor switches are respectively connected to terminals B1 to B8 of voltage detection• rebalance control circuit 14, through driving signal lines. Voltage detection• rebalance control circuit 14 turns on a specified discharge switch among discharge switches SW1 to SW8, and then a current from the specified single cell flows through the discharge resistor, and thus the remaining capacity of the specified single cell can be reduced. For example, in a simplest rebalance control, a single cell (lowest cell) having a lowest voltage is specified among single cells VC1 to VC8. Then, single cells (=other cells) other than the lowest cell, are discharged such that voltages of the other cells are equalized to the lowest voltage.

Here, the circuit configuration of FIG. 1 controls such that specified discharge switch SWn and both adjacent discharge switches SW(n−1), SW(n+1) are not turned on simultaneously. The cell rebalance method using the circuit configuration of FIG. 1, is classified into a passive method. In such a cell rebalance method, single cells having relatively high voltages or remaining capacities, are discharged to impedance elements, such as resistors, to generate power consumption (electric power loss). Thereby, the remaining capacities of the single cells are equalized. Here, the cell rebalance method is not limited to the passive method, and the active method using capacitors can be available. Thus, there is no restriction on the method of cell rebalance. Compared with the passive method, the active method can reduce power consumption (electric power loss), but enlarges the circuit scale.

DC-DC converter 15 as a stabilized power supply, converts the assembled battery voltage to another direct current voltage. As such a stabilized power supply, a linear regulator or a switching regulator is available, and then there is no restriction on its configuration or method. Hereinafter, a three-terminal regulator IC is assumed to be used in the present exemplary embodiment.

Switch SW0 is inserted at a power supply line connecting the positive electrode of assembled battery 11 and the input terminal of DC/DC converter 15. By turning off switch SW0, power supply from assembled battery 11 to DC/DC converter can be cut off. Here, at such a power supply line, a resistor or an EMC (Electro Magnetic Compatibility) filter for suppressing rush currents or noises can be disposed.

DC/DC converter 15 reduces the assembled battery voltage to make stable voltage Vcc (for example, 5.0V), and it is supplied to unit rebalance circuit 16. Unit rebalance circuit 16 includes discharge resistor RB10 and discharge switch SW9, and is a circuit which adjusts power consumption of assembled battery 11 by using power consumption (electric power loss) of discharge resistors RB10. One end of discharge resistor RB10 is connected to the output of DC/DC converter 15, and another end of discharge resistor 10 is connected to one end of discharge switch 9. Another end of discharge switch 9 is connected to the ground of power storage unit 10.

A semiconductor switch (a MOSFET or an IGBT), or a relay, can be used also as discharge resistor SW9. In a case where the semiconductor switch is used, a gate terminal of the semiconductor switch is connected to terminal B9 of voltage detection• rebalance control circuit 14, through a driving signal line. Voltage detection• rebalance control circuit 14 turns on discharge switch SW9, and then a current from assembled battery 11 flows through discharge resistor RB10, and thus the remaining capacity of assembled battery 11 can be reduced. Unit rebalance circuit 16 is not limited to a configuration in which discharge resistor RB10 and discharge switch SW9 are used, and for example, a constant current circuit can be used as unit rebalance circuit 16. In any one of the configurations, rebalance is carried out among the plurality of assembled batteries 11.

Further, a plurality of unit rebalance circuits 16 may be provided. By changing the number of effective unit rebalance circuits 16, discharge amount from assembled battery 11 can be adjusted. Then, also by using a variable resistor of the discharging resistor, discharge amount from assembled battery 11 can be adjusted.

Voltage detection• rebalance control circuit 14 has the function in which each voltages of single cells VC1 to VC8 are measured, and the assembled battery voltage as the both-end voltage of assembled battery 11 is measured. Voltage detection• rebalance control circuit 14 also has the cell rebalance function in which rebalance of voltages or remaining capacities among single cells VC1 to VC8 is carried out by using cell rebalance circuit 13. Voltage detection• rebalance control circuit 14 also has the unit rebalance function in which rebalance of voltages or remaining capacities among the plurality of assembled batteries 11 configured of power storage system 1 is carried out by using unit rebalance circuit 16.

Since there is a stable relation (OCV-SOC curve) between the open circuit voltage (OCV) of cell and the remaining capacity (SOC), voltage detection• rebalance control circuit 14 can estimate the remaining capacity (SOC) from the open circuit voltage (OCV) of cell. Then, since the relation of both changes depending on a temperature or deterioration state, it is necessary that voltage detection• rebalance control circuit 14 estimates the remaining capacity from the detected voltage of cell, considering a temperature or deterioration state. A process of estimating the remaining capacity (SOC) from the open circuit voltage (OCV) of cell may be carried out in control circuit 20. Here, the remaining capacity (SOC) of cell can be also estimated by integrating a current flowing through the cell.

Voltage detection• rebalance control circuit 14 includes a control interface IF. Voltage detection• rebalance control circuit 14 outputs a voltage value or a remaining capacity of each of the plurality of single cells VC1 to VC8, and a voltage value or a remaining capacity of assembled battery 11 from the control interface IF. Additionally, voltage detection• rebalance control circuit 14 controls cell rebalance circuit 13 and unit rebalance circuit 16 based on control signals inputted from the control interface IF.

In FIG. 1, an ASIC (Application Specific Integrated Circuit) of an integral structure of the voltage detection circuit, the rebalance control circuit, and the control interface IF, is shown as one example.

It is possible that the ASIC includes at least one part of cell rebalance circuit 13, unit rebalance circuit 16, and DC-DC converter 15. In contrast, it is possible that the voltage detection circuit and the rebalance control circuit are provided separately.

In FIG. 1, the power source voltage of voltage detection• rebalance control circuit 14 is made by reducing the assembled battery voltage inputted from the power source terminal C0 through the DC/DC converter (not shown in figures) of a three-terminal regulator or the like. Alternatively, the power source voltage of voltage detection• rebalance control circuit 14 can be made by taking inside the output voltage of DC-DC converter 15 provided outside DC/DC converter.

As shown in FIG. 2, power storage system 1 relating to the exemplary embodiment, has a plurality of power storage units 10a to 10d, and control circuit 20 which manages and controls the plurality of power storage units 10a to 10d. In the example shown in FIG. 2, 4 pieces of power storage units 10a to 10d are connected in series, to make a high voltage. The configuration of each of power storage units 10a to 10d, correspondents to power storage unit 10 shown in FIG. 1.

The plurality of power storage units 10a to 10d and control circuit 20 are connected by control signal line 30, and are capable to communicate mutually. A connection style or a communication method is arbitrary. For example, cell controllers 12a to 12d of power storage units 10a to 10d and control circuit 20 are star-connected respectively as the center of control circuit 20 with one to one relation. Alternatively, a communication method can be used, where a communication bus is provided and the plurality of power storage units 10a to 10d and control circuit 20 are communicated by respectively accessing the communication bus. Further, a daisy chain communication method can be used, where data are successively transferred by a bucket relay system between cell controllers 12a to 12d and control circuit 20.

When the daisy chain communication method is used, as a cell controller is located nearer to the end, its communication quantity becomes less, and its communication load becomes lighter. In contrast, as a cell controller is located nearer to control circuit 20, its communication quantity becomes more, and its communication load becomes heavier. Accordingly, in the daisy chain communication method, the dispersion of power consumptions among the cell controllers becomes large.

Control circuit 20 has a function where single cells in the plurality of storage units 10a to 10d are rebalanced, and another function where assembled batteries 11a to 11d in the plurality of storage units 10a to 10d are rebalanced. Control circuit 20, for example, is configured of a MPU (Micro Processing Unit).

Control circuit 20 obtains the voltage value or the remaining capacity of each of single cells VC1 to VC8 in each of power storage units 10a to 10d, through control signal line 30. Control circuit 20 notifies power storage units 10a to 10d of control signals to equalize the obtained single cell voltages or remaining capacities. For example, control circuit 20 starts cell rebalance controlling, when a difference between the lowest voltage or remaining capacity and the highest voltage or remaining capacity, among the obtained voltages or remaining capacities of the plurality of single cells, exceeds the threshold. Alternatively, cell rebalance controlling may be carried out periodically.

Control circuit 20 determines the target voltage value or target capacity to the single cells contained in the plurality of power storage units 10a to 10d. For example, the lowest voltage or remaining capacity, among the voltages or remaining capacities of the plurality of single cells, can be used as the target voltage value or target capacity. Control circuit 20 determines a discharge time length (that is, an ON time of the discharge switch) of each of the single cells, corresponding to the difference between the target voltage value or target capacity and the obtained voltage or remaining capacity of each of the plurality of single cells. As the difference is larger, the discharge time length becomes longer. Control circuit 20 notifies power storage units 10a to 10d of the discharge time length of each of the single cells, through control signal line 30. Alternatively, control circuit 20 may notify power storage units 10a to 10d of the target voltage value or target capacity, and the discharge time length of each of the single cells may be determined by each of cell controllers 12a to 12d.

Control circuit 20 obtains the detected voltage value or the remaining capacity of each of assembled batteries 11a to 11d in each of power storage units 10a to 10d, through control signal line 30. Control circuit 20 notifies power storage units 10a to 10d of control signals to equalize the obtained voltages or remaining capacities of assembled batteries 11a to 11d. For example, control circuit 20 starts unit rebalance controlling, when a difference between the lowest voltage or remaining capacity and the highest voltage or remaining capacity, among the obtained voltages or remaining capacities of the plurality of assembled batteries 11a to 11d, exceeds the threshold. Alternatively, unit rebalance controlling may be carried out periodically.

Control circuit 20 determines the target voltage value or target capacity to assembled batteries 11a to 11d contained in the plurality of power storage units 10a to 10d. For example, the lowest voltage or remaining capacity, among the voltages or remaining capacities of the plurality of assembled batteries 11a to 11d, can be used as the target voltage value or target capacity. Control circuit 20 determines a discharge time length (that is, an ON time of discharge switch SW9) of each of assembled batteries 11a to 11d, corresponding to the difference between the target voltage value or target capacity and the obtained voltage or remaining capacity of each of assembled batteries 11a to 11d. As the difference is larger, the discharge time length becomes longer. Control circuit 20 notifies power storage units 10a to 10d of the discharge time length of each of assembled batteries 11a to 11d, through control signal line 30. Alternatively, control circuit 20 may notify power storage units 10a to 10d of the target voltage value or target capacity, and the discharge time length of each of assembled batteries 11a to 11d may be determined by each of cell controllers 12a to 12d.

In the above-mentioned configuration, control circuit 20 determines the ON time of discharge switch SW9 so as to equalize the obtained voltages or remaining capacities of assembled batteries 11a to 11d. However, only the unit rebalance controlling does not necessarily need to realize equalizing the voltages or remaining capacities of assembled batteries 11a to 11d. Concretely, control circuit 20 specifies the lowest voltage or remaining capacity among the plurality of single cells VC1 to VC8 constituting its assembled battery in regard to each of assembled batteries 11a to 11d. Then, in order to equalize a plurality of the specified lowest voltages or remaining capacities, control circuit 20 may respectively determine the ON time of discharge switch SW9 in regard to each of the assembled batteries (modified unit rebalance controlling).

In such a modified unit rebalance controlling, only by this modified unit rebalance controlling, the plurality of the specified lowest voltages in regard to each of assembled batteries 11a to 11d, are merely equalized. Then, equalizing the voltage values or remaining capacities of assembled batteries 11a to 11d cannot be realized. However, by a combination of the above-mentioned cell rebalance controlling, equalizing the voltage values or remaining capacities of assembled batteries 11a to 11d can be realized. According to this configuration, control circuit 20 can perform the above-mentioned cell rebalance controlling and the above-mentioned unit rebalance controlling, independently.

For example, relatively large differences among discharge amounts of assembled batteries by cell rebalance controlling, may happen, depending on the frequency of cell rebalance controlling or unit rebalance controlling. The discharge amount of cell rebalance controlling is decided based on the differences of the voltages or remaining capacities among the plurality of the single cells constituting its assembled battery. However, there is no relation between those differences and the magnitude relation among the voltages or remaining capacities of the assembled batteries. Concretely, even in a case where the voltages of the assembled batteries coincide with each other (a state where unit rebalance controlling is carried out in advance), the differences of the voltages or remaining capacities among the plurality of the single cells constituting its assembled battery may happen. When cell rebalance controlling is carried out after this state, dispersion among the voltages of the assembled batteries happens. Therefore, when control circuit 20 determines a discharge time length (that is, an ON time of discharge switch SW9) of each of assembled batteries 11a to 11d, corresponding to the difference between the target voltage value or target capacity and the obtained voltage or remaining capacity of each of assembled batteries 11a to 11d, it is necessary that unit rebalance controlling is carried out after cell rebalance controlling is carried out in advance.

On the contrary to this, when unit rebalance controlling is carried out such that the plurality of the specified lowest voltages in regard to each of assembled batteries 11a to 11d, are equalized, cell rebalance controlling does not influence. For example, even when where cell rebalance controlling is carried out in a state where the plurality of the specified lowest voltages in regard to each of assembled batteries 11a to 11d are equalized, dispersion in the plurality of the specified lowest voltages in regard to each of assembled batteries 11a to 11d, does not happen. In addition, even when discharge switches SW9 in regard to each of the assembled batteries are controlled so as to equalize the plurality of the specified lowest voltages or remaining capacities in case where the voltages or remaining capacities among the plurality of the single cells constituting its assembled battery are equal and there is a difference among the voltages or remaining capacities of the assembled batteries, a difference among the voltages or remaining capacities of the plurality of the single cells constituting its assembled battery does not occur. Therefore, when unit rebalance controlling is carried out such that the plurality of the specified lowest voltages in regard to each of assembled batteries 11a to 11d, are equalized, cell rebalance controlling and unit rebalance controlling can be carried out independently, without the sequential relation or dependence relationship of both controllings. Here, when both controllings are carried out periodically, both controllings may be started simultaneously or separately. Generally, current amount discharged from the assembled battery by unit rebalance controlling is equal to or more than current amount discharged from the single cells by cell rebalance controlling. Therefore, when both controllings are carried out simultaneously, unit rebalance controlling is completed, simultaneously with a completion of cell rebalance controlling, or after its completion.

Control circuit 20 performs the above-mentioned cell rebalance controlling and the above-mentioned unit rebalance controlling, independently. Both controllings can be carried out without the sequential relation or dependence relationship. Here, when both controllings are carried out periodically, both controllings may be started simultaneously or separately. Generally, current amount discharged from the assembled battery by unit rebalance controlling is equal to or more than current amount discharged from the single cells by cell rebalance controlling. Therefore, when both controllings are carried out simultaneously, unit rebalance controlling is completed, simultaneously with a completion of cell rebalance controlling, or after its completion.

Control circuit 20 can perform cell the rebalance controlling and the unit rebalance controlling, in a state where power storage system 1 is electrically disconnected from an external device (for example, a load or a charger) or in a state where power storage system 1 is electrically connected to the external device. Namely, such controllings may be carried out, during waiting, or during charging or discharging, regardless of its operating states.

Consumption currents of the plurality of cell controllers 12a to 12d included in power storage system 1, are not necessarily equal. For example, when there is a dispersion in the part constant or the temperature property among cell controllers 12a to 12d due to the product variation among cell controllers 12a to 12d, consumption currents become unequal. Also, when there is the deviation in the communication loads among cell controllers 12a to 12d, consumption currents become unequal. In the above-mentioned daisy chain communication method, the load of the cell controller which directly communicates with control circuit 20, becomes heaviest, and its controlling circuit becomes largest.

In this exemplary embodiment, each of cell controllers 12a to 12d is provided with unit rebalance circuit 16, the consumption current of each of cell controllers 12a to 12d is individually adjusted. Accordingly, it is possible that the consumption currents of cell controllers 12a to 12d are equalized. Since the consumption currents of cell controllers 12a to 12d are equalized, the dispersion among the cells can be suppressed. As a result, it is possible that cell rebalance circuit 13 can be designed to be downsized. Namely, as the consumption currents of cell controllers 12a to 12d are equalized, a time by which the dispersion of the remaining capacities among the cells becomes large, become long. Therefore, a time length which is spent for the cell rebalance, can be set long, that is, a discharge current can be set small at a time of the cell rebalance. Accordingly, the part sizes of discharge resistors RB1 to RB10 constituting cell rebalance circuit 13 or the like can be made small.

Figure 3:
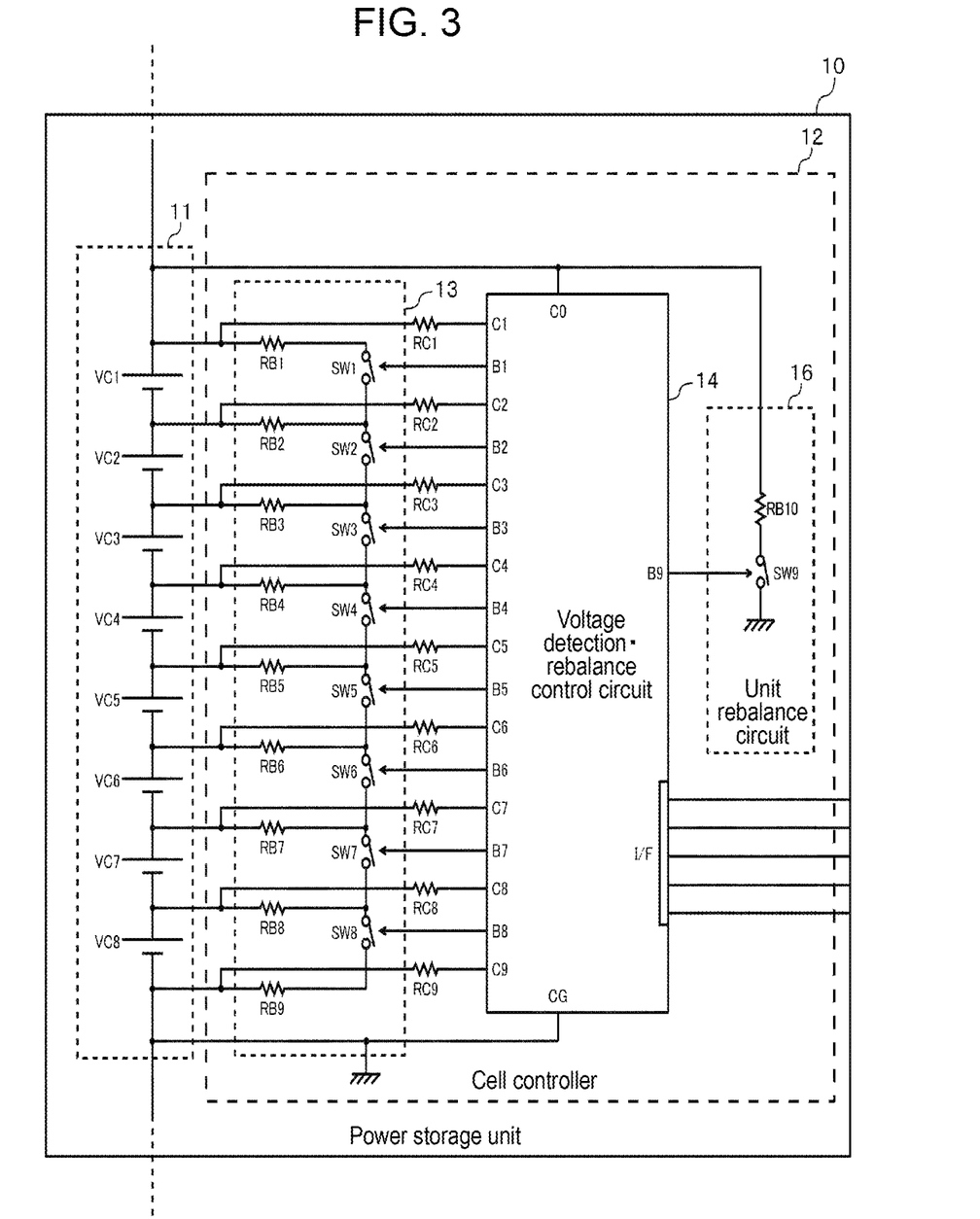
FIG. 3 is a view of a configuration of a power storage unit according to a comparative example.

FIG. 3 is a view of a configuration of power storage unit 10 according to a comparative example. Power storage unit 10 relating to the comparative example, has the configuration in which DC-DC converter 15 and switch SW0 are omitted in power storage unit 10 relating to the exemplary embodiment shown in FIG. 1. In the comparative example, the voltage of the assembled battery is directly inputted as the power source voltage of unit rebalance circuit 16. In this case, it is necessary that unit rebalance circuit 16 is designed corresponding to the voltage of the assembled battery (the number of the single cells connected in series) and the desired power loss (consumption current) in unit rebalance circuit 16. Accordingly, when the voltage of the assembled battery is high voltage (the number of the single cells connected in series is large), it is necessary that a protection part against a noise intruding from the voltage of the assembled battery is added, or the part size is made big considering the part withstand voltage and the part heat generation. Therefore, in the comparative example, it is necessary to enlarge unit rebalance circuit 16.

On the contrary to this, in this exemplary embodiment, the stable voltage of the output voltage from DC-DC converter 15 is directly inputted as the power source voltage of unit rebalance circuit 16. This stable voltage is set at a low voltage (for example, 5.0V), and thereby unit rebalance circuit 16 can be downsized. Concretely, since the permissible loss or the part withstand voltage of resistors or switches included in unit rebalance circuit 16 can be lowered, those part sizes can be made small. Further, it is not necessary to add a noise protection part. Therefore, unit rebalance circuit 16 can be downsized. Accordingly, cell controller 12 can also be downsized, and it contributes to downsizing of the whole of power storage system 1.

Additionally, since discharge resistor RB10 is directly connected to assembled battery 11, current flowing through discharge resistor RB10 varies when voltage of the assembled battery varies. Accordingly, in the comparative example, it is necessary to carry out unit rebalance controlling, considering variation of the voltage of the assembled battery. On the contrary to this, in this exemplary embodiment, since DC-DC converter 15 outputting the stable voltage is interposed between assembled battery 11 and discharge resistor RB10, unit rebalance controlling can be carried out by a constant current. Therefore, since it is not necessary to consider the variation of current value flowing through discharge resistor RB10, unit rebalance controlling can be simplified.

In this exemplary embodiment, unit rebalance circuit 16 can be downsized as mentioned above, but DC-DC converter 15 is added. However, DC-DC converter 15 is easy with respect to heat radiation countermeasure, compared with discharge resistor RB10. For example, when DC-DC converter 15 is coupled to a GND plane of a substrate, it has a high heat radiation performance. Additionally, when a regulator IC having a heat sink is used as DC-DC converter 15, a heat radiation performance can be effectively carried out. By efficiently radiating heat, DC-DC converter 15 can be downsized.

On the contrary to this, in the comparative example, since discharge resistor RB10 is directly coupled to assembled battery 11, it is necessary to insulate discharge resistor RB10 from a GND plane of a substrate, and designing heat radiation is difficult. In order to satisfy both of insulation and heat radiation, it is necessary to enlarge the part size.

In this way, by adding a small size of DC-DC converter 15, unit rebalance circuit 16 can be prevented from being enlarged. Therefore, while increase of circuit size and cost is prevented, rebalance among assembled batteries 11*a* to 11*d* of power storage units 10*a* to 10*d* can be carried out. Additionally, rebalance among the plurality of cells included in power storage units 10*a* to 10*d* can be carried out.

The present invention has been described based on the exemplary embodiment. A person of the ordinary skill in the art can understand that the exemplary embodiment is illustrative only, constitution elements and combined processes can be modified, and such modified examples are covered by the scope of the present invention.

In the above-mentioned the exemplary embodiment, the plurality of power storage units 10*a* to 10*d* are connected in series. Alternatively, the plurality of power storage units 10*a* to 10*d* may be connected in parallel. In this case, the capacity of power storage system 1 is increased.

Further, in the above-mentioned the exemplary embodiment, both of unit rebalance controlling and cell rebalance controlling are carried out in power storage system 1. Alternatively, only unit rebalance controlling may be carried out. For example, when nickel hydride cells are used, there are many cases where cell rebalance controllings are not carried out.

In the above-mentioned exemplary embodiment, the example is assumed that the power storage system 1 is used for a power source device for vehicles. However, the power storage system is not limited to use for vehicles, and then can be used as the power source device for airplanes, for ships, for stationary types, or for other uses.

The exemplary embodiment may be specified by items described below.

[Item 1]

A power storage unit (10) comprising:
- a voltage detection circuit (14) that detects voltages of a plurality of series connected cells (VC1-VC8) in a power storage unit, and receives a supply of a power supply voltage from both ends of the plurality of cells (VC1-VC8);
- a DC-DC converter (15) that converts a voltage between both ends of the plurality of cells (VC1-VC8) into another DC voltage (VCC); and
- an adjustment circuit (16) that adjusts power consumption of the plurality of cells (VC1-VC8), and operates using the another DC voltage (VCC) generated by the DC-DC converter (15) as a power supply voltage.

Accordingly, the adjustment circuit (16) can be downsized.

[Item 2]

The power storage unit (10) according to item 1,
wherein the DC-DC converter (15) reduces the voltage between both ends of the plurality of cells (VC1-VC8), and supplies a reduced voltage to the adjustment circuit (16). Accordingly, the withstand voltage of the parts constituting the adjustment circuit (16) can be decreased.

[Item 3]

The power storage unit (10) according to item 1 or 2,
wherein the adjustment circuit (16) includes a resistor (RB10) and a switch (SW9),
the voltage detection circuit (14) controls the switch (SW9) so as to adjust the power consumption of the plurality of cells (VC1-VC8).

Accordingly, the adjustment circuit (16) has a simple configuration, the adjustment circuit (16) can be downsized.

[Item 4]

The power storage unit (10) according to any one of items 1 to 3,
wherein the voltage detection circuit (14) notifies a control circuit (20) of the voltage between both ends of the plurality of cells (VC1-VC8), as a unit voltage or a unit remaining capacity,
the control circuit (20) obtains the unit voltage or the unit remaining capacity from each of the power storage unit (10) and another power storage unit (10b-10d) connected in series or parallel with the power storage unit (10a), and the control circuit (20) notifies the power storage unit and the another power storage unit of control signals to equalize the obtained unit voltages or unit remaining capacities, and
the voltage detection circuit (14) controls the adjustment circuit (16), based on the control signal from the control circuit (20).

Accordingly, it is possible to carry out unit rebalance controlling among the plurality of power storage units.

[Item 5]

The power storage unit (10) according to item 4,
further comprising an equalizing circuit (13) for equalizing voltages or remaining capacities of the plurality of cells (VC1-VC8),
wherein the voltage detection circuit (14) notifies the control circuit (20) of the voltages or remaining capacities of the plurality of cells (VC1-VC8),
the control circuit (20) obtains the voltages or remaining capacities of the plurality of cells (VC1-VC8) from each of the power storage unit (10a) and the another power storage unit (10b-10d) connected in series or parallel with the power storage unit (10a), and the control circuit (20) notifies the power storage unit and the another power storage unit of control signals to equalize the obtained voltages or remaining capacities of the plurality of cells, and
the voltage detection circuit (14) controls the equalizing circuit (13), based on the control signal from the control circuit (20).

Accordingly, it is possible to carry out cell rebalance controlling among a plurality of cells.

[Item 6]

a plurality of power storage units (10a-10d) that are connected in series or parallel; and
a control circuit (20) that controls the plurality of power storage units (10a-10d),
wherein each of the plurality of power storage units (10a-10d) include;
a voltage detection circuit (14) that detects voltages of a plurality of series connected cells (VC1-VC8) in a power storage unit, and receives a supply of a power supply voltage from both ends of the plurality of cells (VC1-VC8);
a DC-DC converter (15) that converts a voltage between both ends of the plurality of cells (VC1-VC8) into another DC voltage (VCC); and
an adjustment circuit (16) that adjusts power consumption of the plurality of cells (VC1-VC8), and operates using the another DC voltage (VCC) generated by the DC-DC converter (15) as a power supply voltage.

Accordingly, the adjustment circuit (16) can be downsized.

[Item 7]

The power storage system (1) according to item 6,
wherein the voltage detection circuit (14) each of the plurality of power storage units (10a-10d) notifies a control circuit (20) of the voltage between both ends of the plurality of cells (VC1-VC8), as a unit voltage or a unit remaining capacity,
the control circuit (20) obtains the unit voltage or the unit remaining capacity from each of the plurality of power storage units (10a-10d), and the control circuit (20) notifies each of the plurality of power storage units (10a-10d), of the control signal to equalize the obtained unit voltages or unit remaining capacities, and
the voltage detection circuit (14) of each of the plurality of power storage units (10a-10d) controls the adjustment circuit (16), based on the control signal from the control circuit (20).

Accordingly, it is possible to carry out unit rebalance controlling among the plurality of power storage units.

[Item 8]

The power storage system (1) according to item 7,
wherein each of the plurality of power storage units (10a-10d) include,
an equalizing circuit (13) for equalizing voltages or remaining capacities of the plurality of cells (VC1-VC8),
wherein the voltage detection circuit (14) of each of the plurality of power storage units (10a-10d) notifies the control circuit (20) of the voltages or remaining capacities of the plurality of cells (VC1-VC8),
the control circuit obtains the voltages or remaining capacities of the plurality of cells (VC1-VC8) from each of the plurality of power storage units, and the control circuit notifies each of the plurality of power storage units (10a-10d), of the control signal to equalize the obtained voltages or remaining capacities, and
the voltage detection circuit (14) of each of the plurality of power storage units (10a-10d) controls the equalizing circuit (13), based on the control signal from the control circuit (20).

Accordingly, it is possible to carry out cell rebalance controlling among a plurality of cells.

[Item 9]

The power storage system (1) according to item 8,
wherein the control circuit (20) independently carries out;
a control to equalize the unit voltages or the unit remaining capacities in the plurality of power storage units (10a-10d); and another control to equalize the voltages or remaining capacities of the plurality of cells in the plurality of power storage units (10a-10d).

Accordingly, it is possible to carry out flexible rebalance controlling.

The invention claimed is:

1. A power storage unit comprising:
a voltage detection circuit that detects voltages of a plurality of series connected cells in a power storage unit, and receives a supply of a power supply voltage from both ends of the plurality of cells;
a DC-DC converter that converts a voltage between both ends of the plurality of cells into another DC voltage; and
an adjustment circuit that adjusts power consumption of the plurality of cells, and operates using the another DC voltage generated by the DC-DC converter as a power supply voltage, wherein the adjustment circuit includes a resistor and a switch directly connected to an output of the DC-DC converter, and the DC-DC converter is interposed between the power storage unit and the resistor.

2. The power storage unit according to claim 1,
wherein the DC-DC converter reduces the voltage between both ends of the plurality of cells, and supplies a reduced voltage to the adjustment circuit.

3. The power storage unit according to claim 1,
wherein the voltage detection circuit notifies a control circuit of the voltage between both ends of the plurality of cells, as a unit voltage or a unit remaining capacity,
the control circuit obtains the unit voltage or the unit remaining capacity from each of the power storage unit and another power storage unit connected in series with the power storage unit, and the control circuit notifies the power storage unit and the another power storage unit of control signals to equalize the obtained unit voltages or unit remaining capacities, and
the voltage detection circuit controls the adjustment circuit, based on the control signal from the control circuit.

4. The power storage unit according to claim 3,
further comprising an equalizing circuit for equalizing voltages or remaining capacities of the plurality of cells,
wherein the voltage detection circuit notifies the control circuit of the voltages or remaining capacities of the plurality of cells,
the control circuit obtains the voltages or remaining capacities of the plurality of cells from each of the power storage unit and the another power storage unit connected in series with the power storage unit, and the control circuit notifies the power storage unit and the another power storage unit of control signals to equalize the obtained voltages or remaining capacities of the plurality of cells, and
the voltage detection circuit controls the equalizing circuit, based on the control signal from the control circuit.

5. A power storage system comprising:
a plurality of power storage units that are connected in series or parallel; and
a control circuit that controls the plurality of power storage units,
wherein each of the plurality of power storage units includes;
a voltage detection circuit that detects voltages of a plurality of series connected cells in a power storage unit, and receives a supply of a power supply voltage from both ends of the plurality of cells;
a DC-DC converter that converts a voltage between both ends of the plurality of cells into another DC voltage; and
an adjustment circuit that adjusts power consumption of the plurality of cells, and operates using the another DC voltage generated by the DC-DC converter as a power supply voltage, wherein the adjustment circuit includes a resistor and a switch directly connected to an output of the DC-DC converter, and the DC-DC converter is interposed between the power storage unit and the resistor.

6. The power storage system according to claim 5,
wherein the voltage detection circuit of each of the plurality of power storage units notifies the control circuit of the voltage between both ends of the plurality of cells, as a unit voltage or a unit remaining capacity,
the control circuit obtains the unit voltage or the unit remaining capacity from each of the plurality of power storage units, and the control circuit notifies each of the plurality of power storage units, of the control signal to equalize the obtained unit voltages or unit remaining capacities, and
the voltage detection circuit of each of the plurality of power storage units controls the adjustment circuit, based on the control signal from the control circuit.

7. The power storage system according to claim 6,
wherein each of the plurality of power storage units include
an equalizing circuit for equalizing voltages or remaining capacities of the plurality of cells,
the voltage detection circuit of each of the plurality of power storage units notifies the control circuit of the voltages or remaining capacities of the plurality of cells,
the control circuit obtains the voltages or remaining capacities of the plurality of cells from each of the plurality of power storage units, and the control circuit notifies each of the plurality of power storage units, of the control signal to equalize the obtained voltages or remaining capacities, and
the voltage detection circuit of each of the plurality of power storage units controls the equalizing circuit, based on the control signal from the control circuit.

8. The power storage system according to claim 7,
wherein the control circuit independently carries out: a control to equalize the unit voltages or the unit remaining capacities in the plurality of power storage units; and another control to equalize the voltages or remaining capacities of the plurality of cells in the plurality of power storage units.

* * * * *